H. GRAY.
Land-Roller.
No. 53,439. Patented Mar. 27, 1866.
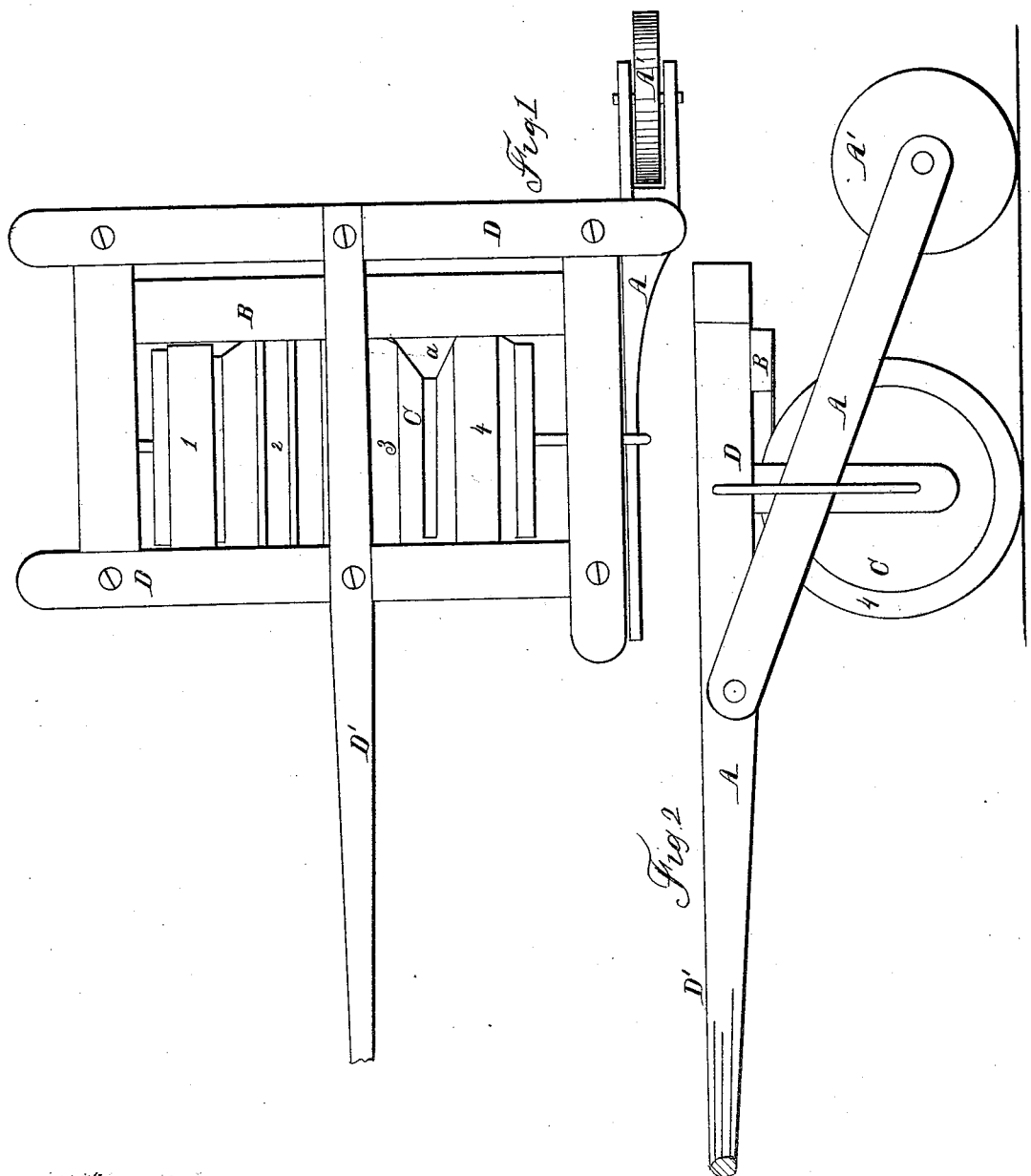

UNITED STATES PATENT OFFICE.

HARMAN GRAY, OF MILLARD, WISCONSIN.

IMPROVEMENT IN GARDEN-ROLLERS FOR DESTROYING INSECTS.

Specification forming part of Letters Patent No. 53,439, dated March 27, 1866.

*To all whom it may concern:*

Be it known that I, HARMAN GRAY, of Millard, in the county of Walworth and State of Wisconsin, have invented a new and Improved Land-Roller; and I do hereby declare that the following is a full, clear, and exact description thereof, reference being had to the accompanying drawings, making a part of this specification, in which—

Figure 1 is a plan view of the improved roller. Fig. 2 is an elevation of one side of the same.

The object of this invention is to provide a machine which will readily follow the drills made by a seeding-machine and pack the earth so tightly about the seed and at the same time pulverize the clods of earth, that the chinch-bug cannot enter the earth and lay its eggs near the seed. Said machine will also pack the earth about the seeds, and prevent thereby the rapid escape of moisture from the surface-soil, as will be hereinafter shown.

To enable others skilled in the art to understand my invention, I will describe its construction and operation.

In the accompanying drawings I have represented a roller having a number of annular elevations formed on its circumference of different forms; but in practice, either one of these forms may be adopted, employing but one form upon a single roller. The roller C may be made of wood or of metal, and it may be made of wood and metal combined, of any required diameter and length. If made of wood and metal the body of the roller will be made cylindrical and of wood, and the ridges or elevations and depressions will be made of metal in the form of hoops or rings, which will be slipped on the cylinder and firmly secured thereto. If desirable, the entire roller may be made of wood by turning the elevations and depressions upon its circumference, or the wooden elevations may be formed by steaming wood and bending it in the form of hoops upon a cylinder. The roller may be made up of staves and heads properly hooped together and loaded.

The axles projecting from the extremities of the roller C have their bearings in projections on the sides and bottom of a frame, D, to which frame the draft-pole D' is secured. On one side of the frame D and pivoted to it, near its forward end, is a beam, A, which inclines downward and backward, and carries between its forked rear end a guide-wheel, A', the object of which is to serve as a gage and a guide for the roller C as the machine is drawn along over the drills. The beam A is prevented from having any lateral play by means of a staple or stay-bar, as shown in Fig. 2.

B represents a bar, which is arranged transversely across the frame D, just in rear of the roller C, and to which a number of scrapers, *a*, are attached, which scrapers conform to the shape of the annular depressions or grooves in said roller C, and scrape off all adhering earth so as to leave the roller always free from earth.

The roller or guide-wheel A' is arranged as far from the center of the first ridge or band upon the roller C as the wheel of the seed drill is from the center of the first drill-tooth, so that by following in the wheel-track made by the wheel of the seed-drill, the ridges or bands upon the roller C will follow and press upon the seed in the drills or rolls.

Having thus described my invention, what I claim as new, and desire to secure by Letters Patent, is—

The guide-wheel A', scraper B, and ridged roller C, all constructed and arranged to operate substantially as described.

HARMAN GRAY.

Witnesses:
 RIAL THOMAS,
 POLLY THOMAS.